(12) United States Patent  
Armorer et al.

(10) Patent No.: US 9,699,233 B1  
(45) Date of Patent: *Jul. 4, 2017

(54) ADAPTIVE PERFORMANCE CONTROL OF MULTI-STREAM DATA TRANSFER FROM A SOURCE SYSTEM TO A TARGET SYSTEM

(71) Applicant: EMC Corporation, Hopkinton, WA (US)

(72) Inventors: Peter Armorer, Milton (CA); Gururaj Kulkarni, Bangalore (IN); Mu Chai, Bellevue, WA (US); Uday Devidas Muchalambe, Bellevue, WA (US); Roland Anthony Fernandes, Bellevue, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/336,700

(22) Filed: Oct. 27, 2016

Related U.S. Application Data

(63) Continuation of application No. 14/755,292, filed on Jun. 30, 2015, now Pat. No. 9,509,612.

(51) Int. Cl.  
*G06F 15/16* (2006.01)  
*H04L 29/06* (2006.01)  
*H04L 12/26* (2006.01)

(52) U.S. Cl.  
CPC ........ *H04L 65/601* (2013.01); *H04L 43/0888* (2013.01); *H04L 65/608* (2013.01)

(58) Field of Classification Search  
None  
See application file for complete search history.

(56) References Cited

U.S. PATENT DOCUMENTS

| | | |
|---|---|---|
| 2009/0196196 A1 | 8/2009 | Gosh |
| 2011/0164518 A1 | 7/2011 | Daraiseh et al. |
| 2013/0185467 A1 | 7/2013 | Challa et al. |
| 2014/0064082 A1 | 3/2014 | Yeung et al. |
| 2015/0271061 A1 | 9/2015 | Buyn |

*Primary Examiner* — Edan Orgad  
*Assistant Examiner* — Rebecca Song  
(74) *Attorney, Agent, or Firm* — Blakely, Sokoloff, Taylor & Zafman LLP

(57) ABSTRACT

According to one embodiment, in response to a request to transfer a data set from a source system to a target system over a network, an adaptive performance control (APC) controller allocates a plurality of data streams for transferring the data set. The APC controller activates one or more data streams from the allocated data streams to transfer the data set from the source system to the target system. The APC controller monitors an overall throughput of the activated data streams assigned to transfer the data set from the source system to the target system. The APC controller dynamically adjusts a number of the activated data streams based on the monitored overall throughput of the activated data streams, such that a maximum overall throughput of the activated data streams is reached while maintaining a minimum number of the activated data streams.

21 Claims, 7 Drawing Sheets

ADAPTIVE PERFORMANCE CONTROL OF MULTI-STREAM DATA TRANSFER FROM A SOURCE SYSTEM TO A TARGET SYSTEM

RELATED APPLICATION

This application is a continuation application of U.S. application Ser. No. 14/755,292, filed Jun. 30, 2015, which is incorporated by reference in its entirety.

FIELD OF THE INVENTION

Embodiments of the present invention relate generally to data processing systems. More particularly, embodiments of the invention relate to multi-stream data transfer from a source data processing system to a target data processing system.

BACKGROUND

Save point backup performs poorly when resources are over-utilized and underperforms when resources are not sufficiently used. A save point refers to a set of data objects that are backed up and later restored together, such as, for example, a storage volume of a file system or a directory of files. Poor performance typically manifests in volatile environments where multiple save point backups unpredictably compete for some bottlenecked resource along the path from source disk to destination backup devices. Manual configuration and performance history analysis have limited value in controlling future degradation of performance or optimizing it when workloads, scheduling and resulting conflicts are unpredictable. Poor performance can persist throughout backup duration, thereby greatly extending the backup windows of impacted save points. In some cases, backups might even crash. Traditional backup does not dynamically handle either under- or over-utilized resources. Other bulk data transfer applications are similar.

Typical over-utilized, i.e. bottlenecked, resources include client data disks but can also be client memory and central processing unit or CPU, the same for the backup server, backup destination devices, input/output or IO buses and the network. A common specific cause of poor performance is too many data streams from multiple different save point backups stressing the same source mechanical disk(s). This results in wasted disk movement overhead. A single save point backup can also experience poor performance by itself when it uses too many data streams or encounters fragmented disk data during various stages of backup. On the other hand, save point backup can under-utilize these same resources, especially source disks, causing subpar performance.

To achieve optimal throughput, a backup administrator typically needs to experiment and statically (re)configure the number of allocated streams for each save point. This is time consuming, error prone and needs periodic maintenance. This is generally not feasible. The static configuration does not automatically adjust runtime backup streaming to optimize throughput in dynamic environments where a save point's data workload or general resource contention might unexpectedly change during and/or between backup sessions. These environments can manifest often and without warning, especially when users initiate their own backups at any time with ad-hoc workloads sharing the same backup resources.

The static configuration of a save point cannot handle the full resource conflict path from the client source disks to the backup server devices and other workloads. For instance, a non-APC backup administrator might assess that three allocated streams perform better than four for a given save point based on pre-backup or actual backup standalone tests involving just that save point at some unrealistic time of day. However, this approach does not consider other competing save point backups and miscellaneous non-backup workloads that might later conflict with the save point during actual backup time.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments of the invention, an adaptive performance control (APC) system is utilized to dynamically control processing resources to better adapt to volatile environments and maintain an optimal throughput. The APC system enables administrators to automatically maximize use of processing resources (e.g., backup resources) whilst mitigating poor performance situations. The APC system especially targets large save points in unpredictable, volatile environments, such as a cloud-based backup provider used 24×7 by various types of customers and workloads. The APC system takes a corrective feedback action to maintain an optimal net aggregate throughput. It leverages a multi-streaming approach to transfer or back up save points, periodically determines each save point's backup throughput, and dynamically adjusts the number of active streams, such that a maximum throughput is achieved while using a minimum amount of processing resources (e.g., the minimum number of active data streams).

During the startup, according to one embodiment, the APC system keeps activating an extra data stream to a preconfigured maximum, such as, for example, four data streams. After the startup, the APC system periodically determines whether to deactivate or subsequently reactivate a data stream to maintain optimal or near-optimal throughput performance using the minimum number of activated data streams. When deciding to reactivate a data stream in competition with others, according to one embodiment, the APC system uses a deterministic approach where possible, else falls back to a probabilistic method. Over the duration of an APC data transfer (e.g., backup), on average each save point's net aggregate throughput is significantly better compared to a non-APC approach. Overall, an administrator does not have to manually or periodically reconfigure save point backups or juggle backup scheduling of competing save points.

Figure 1:
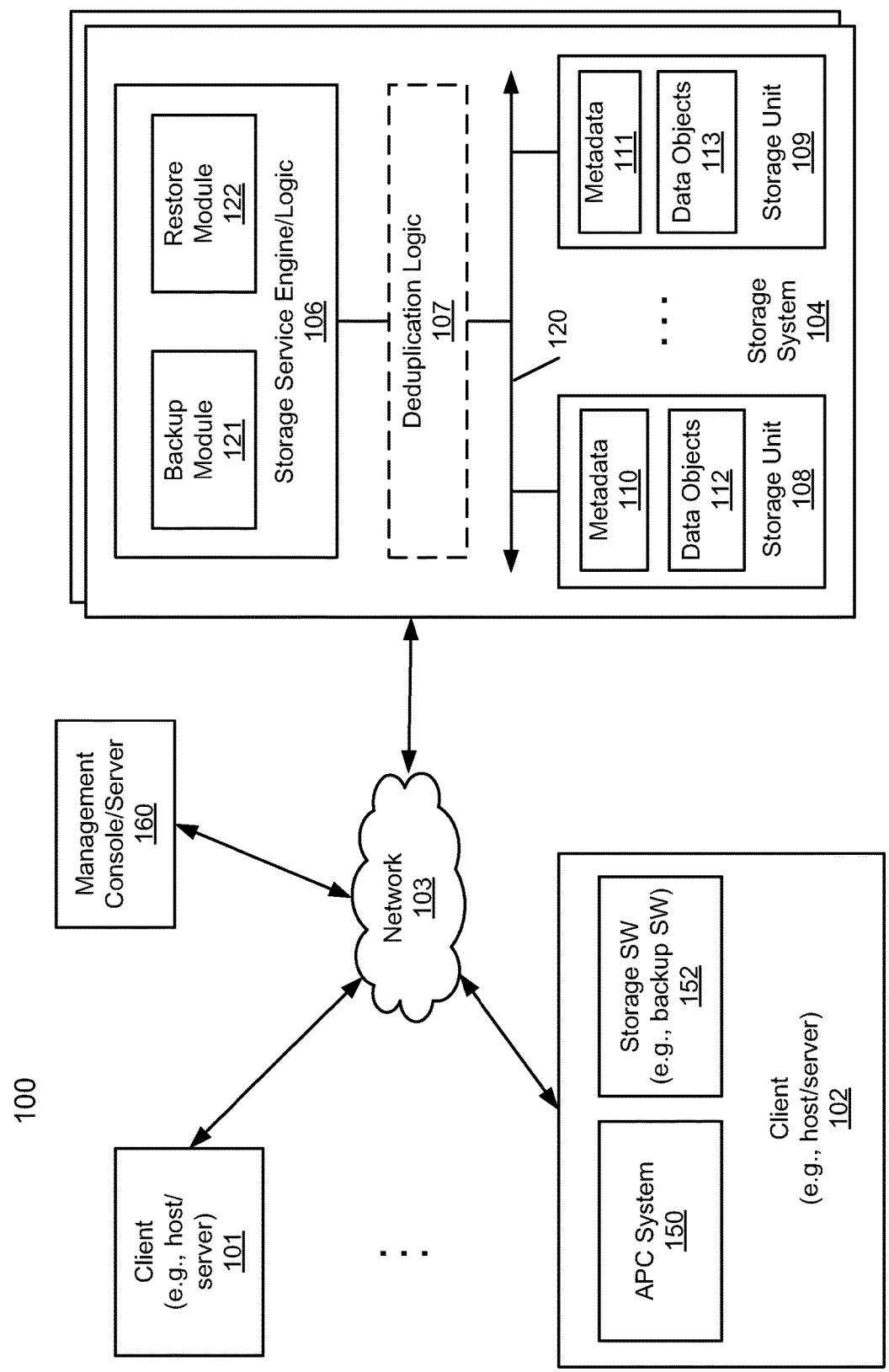
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

According to one embodiment, when a client, such as clients 101-102, transfer a set of data (e.g., backup data) to a remote system such as storage system 104, the client utilizes multiple data streams to transfer the data set. In addition, the client includes an adaptive performance control (APC) system to monitor the performance (e.g., throughput) of the data transfer and to dynamically adjust (e.g., activate, deactivate, or reactivate) some of the data streams, such that a maximum performance can be maintained while using a minimum amount of processing resources.

For the purpose of illustration, client 102 includes APC system 150 communicatively coupled to or integrated with storage software 152. Note that client 102 may have the same or similar architecture of client 101. Although only two client systems are shown, more or fewer client systems (e.g., source systems in this example) can be applied. Similarly, more or fewer of storage system 104 may also be applied. Each of the source systems 101-102 may include similar storage software to transfer (e.g., backup) data to storage system 104 (e.g., backup server) and to restore data from storage system 104.

Storage software 152 may be any kind of data transfer software to transfer data objects to storage system 104 to be stored therein, such as, for example, data backup software, data replication software, or data migration software, etc. In one embodiment, a user or administrator can initiate, configure, and schedule an operation to transfer a set of data objects from client 102 as a source system to storage system 104 as a target system via management server 160. Management server 160 may be a Web or cloud-based server.

In one embodiment, in response to a request to transfer a data set of data objects from source system 102 to target system 104, APC system 150 working with storage software 152 allocates a predetermined number of data streams configured to transfer at least a portion of the data set from source system 102 to target system 104 substantially concurrently. The predetermined number of data streams may be user configurable, for example, by an administrator via management server 160 as part of a data transfer policy configured at management server 160 and pushed down to source system 102 to be stored therein.

According to one embodiment, APC system 150 incrementally activates data streams from the allocated data streams and monitors the overall throughput of the data transfer for a period of time to determine a trend of the throughput. The period of time may also be user configurable. Based on the monitored throughput, APC system 150 periodically adjusts the number of activated data streams to optimize the associated processing resources (e.g., CPU, memory) usage of source 102, while maintaining a relatively maximum throughput.

In one embodiment, if the overall throughput increases, an additional data stream may be activated if there is least one allocated data stream that has not been activated. After all or a subset of the allocated data streams have been activated, APC system 150 may periodically monitor the trend of the throughput for a period of time, which may be user configurable as a part of the data transfer policy. If it is determined that the throughput drops significantly, for example, based on a user configurable threshold per a time unit, APC system 150 may gradually deactivate an activated data stream(s). Note that APC system 150 constantly or periodically monitors the overall throughput of the data transfer while adjusting the number of activated data streams. For example, if the throughput starts to drop off after a while (e.g., a second sampling window) after deactivating a data stream, APC system 150 may reactivate a data stream in an attempt to improve the throughput. That is, the number of activated data streams may be dynamically adjusted up and down dependent upon the throughput of the data transfer at the point in time.

Note that there may be multiple data sets to be transferred from a source system to one or more target systems substantially concurrently. The rationale behind this is that one would want to activate an additional data stream if the additional data steam would further improve the throughput. However, on the other hand, if an additional data stream would not significantly improve the throughput, i.e., the bottleneck is located somewhere else (e.g., network, target system), one would like to deactivate an activated streams. As a result, the associated processing resources can be better used, for example, by other operations, such as data transfer of another data set of the same source system.

Figure 2:
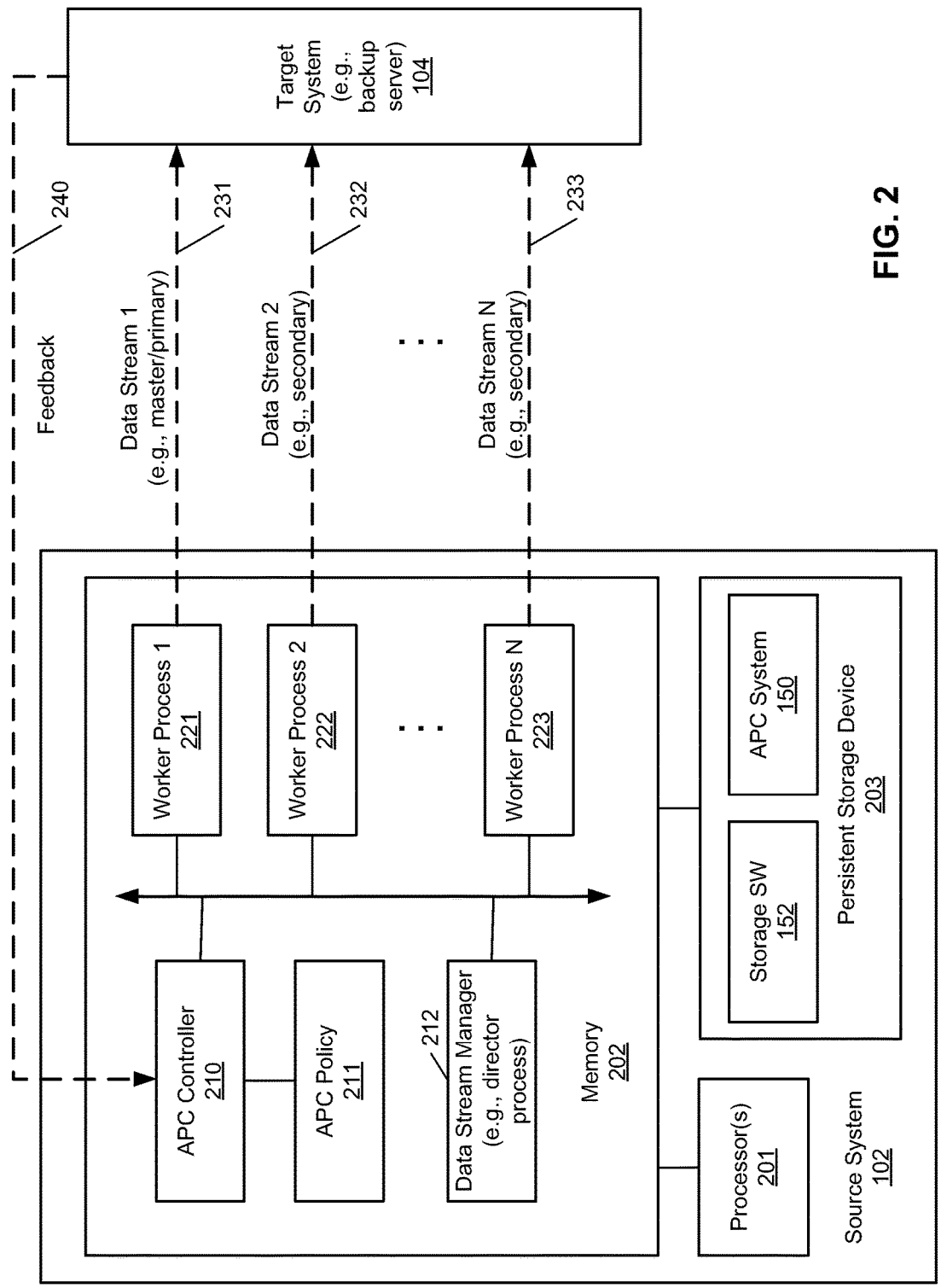
FIG. 2 is a block diagram illustrating a source system to transfer data to a target system according to one embodiment of the invention.

FIG. 2 is a block diagram illustrating a source system to transfer data to a target system according to one embodiment of the invention. Referring to FIG. 2, source system 102 is configured to transfer (e.g., back up, replicate, migrate) a data set to target system 104 over a network using multiple data streams, in this example, N data streams 231-233. Source system 102 includes, but is not limited to, APC controller 210 and data stream manager 212 loaded into memory 202 from persistent storage device 203 and executed by one or more processors 201. Memory 202 may be any kind of volatile memory such as random-access memory (RAM). Persistent storage device 203 may be any kind of non-volatile memory devices such as hard disk or flash memory devices. Processor 201 may be any kind of processors or processing devices, such as, for example, general-purpose processors such as central processing units (CPUs) or special-purpose processors. Source system 102 may further include other components of a typical data processing system, such as, an operating system, network software stack, as well as a network interface card (NIC) to allow source system 102 to be communicatively coupled to a network, for example, to communicate with a remote system such as target system 104. In order not to unnecessarily obscure embodiments of the invention, such components are omitted herein for the purpose of illustration only.

APC 210 may be part of APC system 150 installed and stored in persistent storage device 203. Data stream manager 212 may be part of storage software 152 stored in persistent storage device 203. Storage software 152 may be any kind of data transfer software, such as, for example, backup software, replication software, data migration software, etc. According to one embodiment, when a request is received to transfer a data set (e.g., a save set) from source system 102 to target system 104 over a network, APC controller 210 or data stream manager 212 allocates a predetermined number of data streams configured to transfer the data set to target system 104. The number of data streams to be allocated may be specified by data transfer policy 211, which may be configured by an administrator of an entity associated with source system 102. In one embodiment, the data streams allocated for each data set include four data streams.

According to one embodiment, four of data streams 231-233, a corresponding process or thread may be created and maintained. In this example, worker processes 221-223 are allocated to specifically handle data streams 231-233, respectively. Each of worker processes threads 221-223 may be handled by a respective data transfer module or instance of a data transfer module executed by processor 201 and managed by data stream manager 212. One of the data streams 231-233 handled by worker processes 221-223 may be designed as a master data stream (also referred to as a primary data stream), while remaining data streams are designated as secondary data streams. In this example for the purpose of illustration, data stream 231 is designated as a primary data stream while data streams 232-233 are designed as secondary data streams.

Primary data stream 231 is configured to transmit critical data associated with the corresponding data set, such as, for example, directory information of files within the data set (e.g., backup cataloguing metadata, directory listings of save point dependent sub-directories). In one embodiment, primary data stream 231 is activated first and remains activated, while any one of secondary data streams 232-233 may be activated, deactivated, or reactivated, dependent upon the performance at the point in time. That is, once the primary or master data stream has been activated, it remains activated without ever being deactivated. An activated data stream refers to a data stream that actively transfers data of a data set to a target system. A deactivated data stream refers to a data stream that does not actively transfer data of a data set. Instead, it remains idle without transferring data of the data set. An inactive data stream may periodically send some communications signals to the remote system to keep the connection alive or open, such as heartbeat or beacon signals dependent upon the specific communications protocol of the corresponding connection.

According to one embodiment, APC controller 210 initially activates primary data stream 231 and incrementally activates secondary data streams 232-233, while APC controller 210 monitors the overall throughput of the data transfer. This stage of the data transfer is referred to as a startup phase. During the startup phase, secondary data streams 232-233 may be incrementally or sequentially activated, deactivated, and/or reactivated dependent upon the changes of the throughput during a period of time, until all or a subset of the allocated data streams 231-233 have been activated upon which the startup phase ends.

After primary data stream 231 has been activated, dependent upon the overall throughput of all activated data streams, a next secondary data stream may be activated. In one embodiment, APC controller 210 measures the data transfer performance during a first predetermine period of time (e.g., 1-minute moving window trial sample of the save point's aggregate megabytes per second (MB/sec) throughput, i.e. across all its data streams). The size of data files or their portions sent to and acknowledged as backed up on target system 104 between known points in time can be used to calculate the save point's aggregate throughput. Alternatively, target system 104 could possibly be queried for more accurate metrics per save stream, for example, via feedback path 240. In one embodiment, the two most recent window samples' MB/sec values are recorded. If the primary or master stream was just activated, a secondary data stream may be activated.

According to one embodiment, if the throughput gained due to an additional activated data stream across consecutive moving window samples is below a predetermined threshold, such as 15%, less than 5 MB/sec, or throughput instead drops, a suitable secondary or non-master data stream is deactivated. Any stream deactivated in this step should be the stream with the least amount of unprocessed data remaining from its current file being backed up. That stream's unprocessed queued files are reassigned to the other activated streams. That stream will usually be the last one activated provided it is only assigned smaller-sized files. The rationale behind this is that if the gained throughput is not significant, it may not worth to activate an additional data stream and such a resource may be better used elsewhere. The above process is iteratively performed until all of the data streams 231-233 have been activated or some first data stream is deactivated, which ends the startup phase.

After the startup phase ends, a post-startup phase starts. If APC controller 210 determines that a significant throughput drops across over a second predetermined period of time (e.g., 10-minute window), an activated secondary data stream may be deactivated. APC controller 210 may measure the throughput over multiple consecutive sampling windows of time. In one embodiment, if the throughput drop is greater than a second predetermined threshold (e.g., 15% or at least 5 MB/sec), APC controller 210 may deactivate a secondary data stream that has been previously activated. Particularly, if all data streams are currently activated, APC controller 210 may iteratively monitor the throughput changes over the second predetermined period of time (e.g., 10 minute sampling window) and deactivate at least one data stream for each of the second predetermined period of time if the throughput changing trend satisfies the above condition.

In one embodiment, if the throughput drop is not greater than the second predetermined threshold and there is at least one data stream that has been previously deactivated, APC controller 210 suspends its operations for a third predetermined period of time (e.g., random number from 0 to 4 minutes dependent upon the configuration). Although APC controller 210 suspends its operations, parallel data streaming continues in separate threads or processes. The random reactivation delay provides a statistically crude yet effective way to minimize an APC save point from repeatedly getting into the same reactivate-deactivate cycle with another save point competing for the same stressed resource(s). After the suspension for the third period of time, APC controller 210 reactivates a data stream that has been previously deactivated, and the above process is iteratively performed. In one embodiment, after a data stream has been reactivated, APC controller 210 may monitor the throughput changes for a fourth predetermined period of time (e.g., 1 minute sampling window) to determine whether there is a need to deactivate a data stream again due to a lack of improvement of the throughput in response to the reactivation of a data stream.

Figure 3:
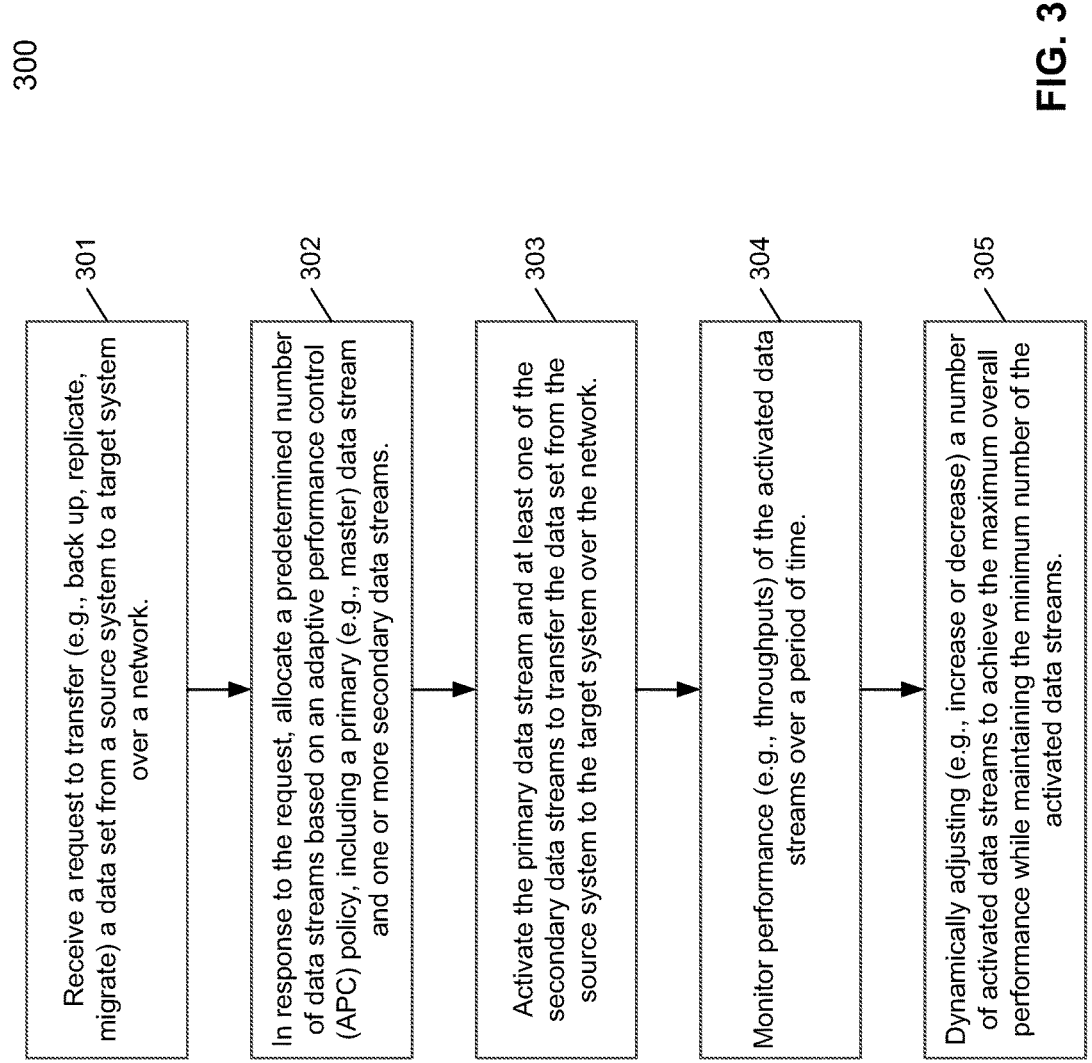
FIG. 3 is a flow diagram illustrating a process for adaptive performance control of data transfer according to one embodiment of the invention.

FIG. 3 is a flow diagram illustrating a process for adaptive performance control of data transfer according to one embodiment of the invention. Process 300 may be performed by processing logic, which may include software, hardware, or a combination thereof. For example, process 300 may be performed by APC controller 210 and/or data stream manager 212 of FIG. 2. Referring to FIG. 3, at block 301, processing logic receives a request to transfer a data set (e.g., backup, replication, migration) from a source system to a target system over a network. In response to the request, at block 302, processing logic allocates a predetermined number of data streams based on an APC policy. The data streams include a primary or master data stream and one or more secondary data streams. The APC policy may be configured by a user or an administrator via a management interface associated with the source system. At block 303, processing logic activates the primary data stream and at least one of the secondary data streams to transfer the data set from the source system to the target system over the network. At block 304, processing logic monitors the overall throughput of the activated data streams over a period of time. At block 305, processing logic dynamically adjusts a number of activated data streams to achieve the maximum overall performance (e.g., maximum overall throughput) of the data transfer, while using the minimum amount of processing resources (e.g., minimum number of activated data streams).

Figure 4:
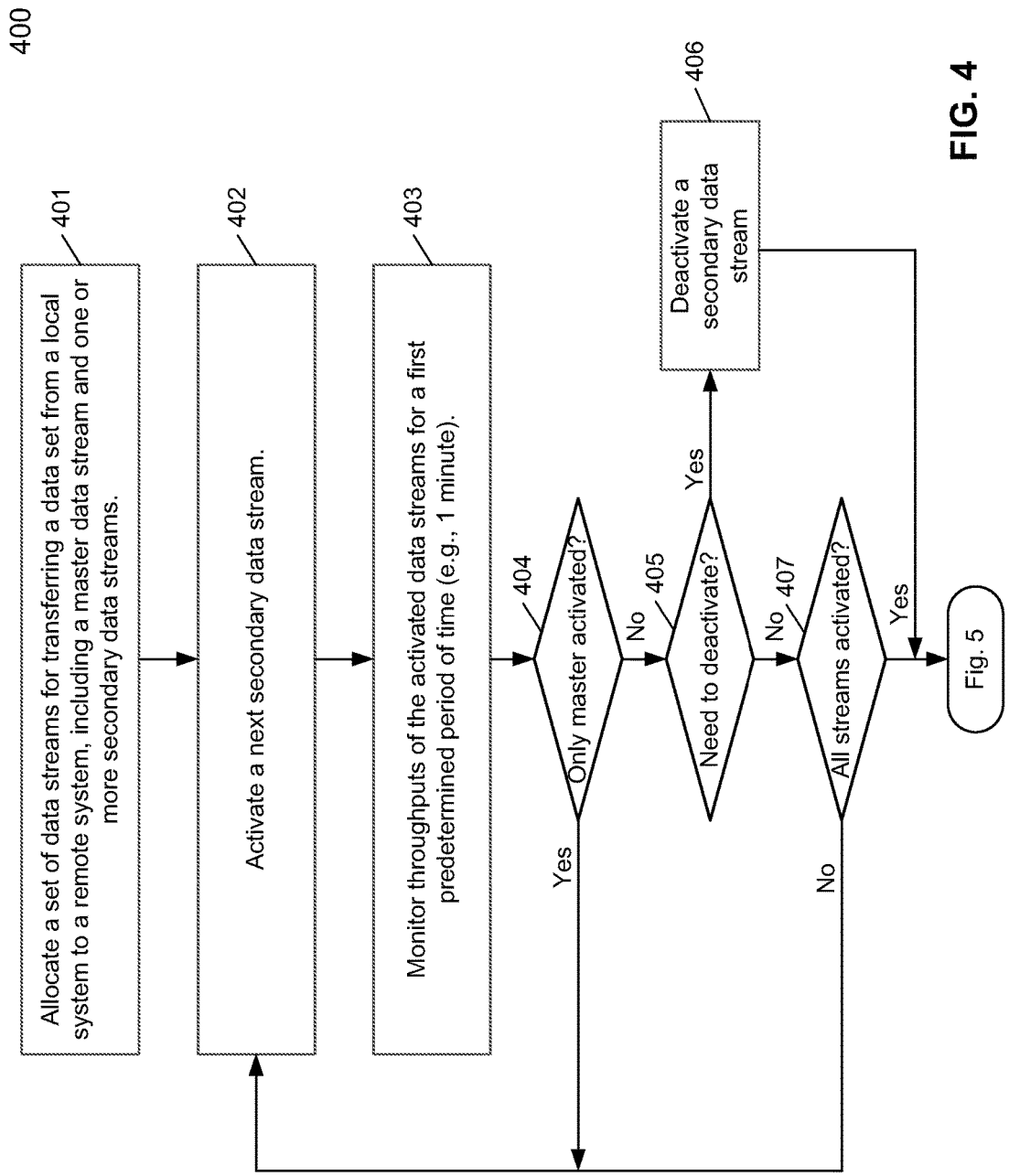
FIG. 4 is a flow diagram illustrating a process of a startup phase for managing data streams according to one embodiment of the invention.

As described above, the process of managing data streams of data transfer includes two phases: 1) startup phase and 2) post-startup phase. FIG. 4 is a flow diagram illustrating a process of a startup phase for managing data streams according to one embodiment of the invention. Process 400 may be performed by processing logic, which may include software, hardware, or a combination thereof. For example, process 400 may be performed by APC controller 210 and/or data stream manager 212 of FIG. 2. Referring to FIG. 4, in response to a request to transfer a data set from a local system to a remote system, at block 401, processing logic initially allocates a set of data streams, including a primary or master data stream and one or more secondary data streams.

In one embodiment, the number of data streams allocated can be user configurable, such as 4 data streams for each data set or each data transfer session. A source system can transfer multiple data sets in multiple data transfer session and each data transfer session is allocated with a predetermined number of data streams. However, this is dependent upon the specific data transfer policy associated with the specific data set or data transfer session. Different data sets or data transfers may be associated with different data transfer policies with different number of data streams to be allocated. For example, a more important, faster, or time-critical data set may be allocated with more data streams.

At block 402, processing logic activates a next secondary data stream, for example, after activating the primary data stream. At block 403, processing logic monitors or observes the over throughput of the activated data streams for a first predetermined period of time (e.g., one or more one-minute sampling windows). At block 404, processing logic determines whether only the primary or master data stream has been activated. If so, a next secondary data stream will be activated at block 402 and the above operations are iteratively performed.

If there are more than just the primary data stream that have been activated, at block 405, processing logic determines whether there is a need to deactivate a data stream that has been previously activated. For example, if the throughput increased due to the incremental activation of data streams does not exceed an expected threshold, such as 15% relative threshold or 5 MB/sec absolute threshold, there is a need to deactivate a data stream. If there is a need to deactivate a data stream, at block 406, processing logic deactivates a secondary data stream. Otherwise, at block 407, processing logic determines whether all data streams have been activated. If there is at least one data stream that has not been activated, processing logic attempts to activate a secondary data stream at block 402 and the above operations are iteratively performed, until all data streams have been activated at block 407 or some first data stream is deactivated at block 406, either of which ends the startup phase and moves onto the post-startup phase as shown in FIG. 5.

Figure 5:
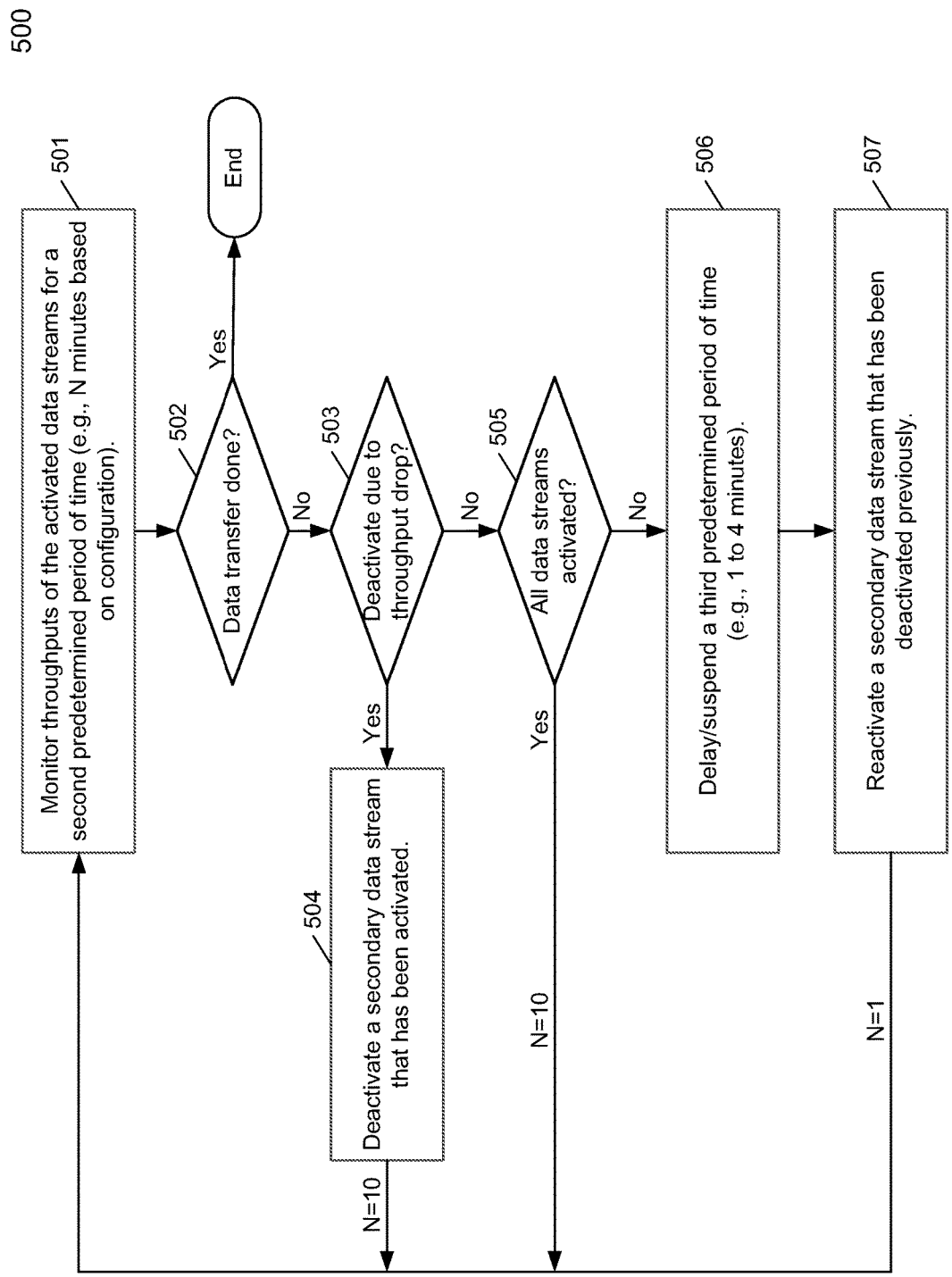
FIG. 5 is a flow diagram illustrating a process of a post-startup phase for managing data streams according to one embodiment of the invention.

Referring now to process 500 of FIG. 5, which represents a process of a post-startup phase according to one embodiment, at block 501, processing logic monitors the overall throughput of all the activated data streams for a second predetermined period of time. The duration of the second predetermine period of time depends on the specific situations described below. It can be one or more 10-minute windows or one or more 1-minute windows, dependent upon the configuration of the corresponding data transfer policy.

At block 502, if the data transfer is completed, process 500 ends. Otherwise, at block 503, processing logic determines whether there is a need to deactivate a data stream that has been previously activated due to a throughput drop and if so, processing logic deactivates a data stream at block 504. In one embodiment, during one or more monitoring or observation windows, if the throughput drops below a predetermined threshold, such as, for example, by more than 15% or exceeding 5 MB/sec drop rate, processing logic may deactivate a data stream. The process loops back to block 501 to monitor the throughput for a period of time, such as, in this example, N=10 for 10 minutes, and the operations above are iteratively performed.

If there is no need to deactivate a data stream, i.e., the throughput drop is not significant enough determined at block 503, processing logic determines whether all the data streams have been activated at block 505. If all the data streams have been activated at this point, the process loops back to block 501 to monitor the throughput for a period of time, such as, in this example, N=10 for 10 minutes, and the operations above are iteratively performed. If there is at least one data stream that has been deactivated determined at block 505, processing logic suspends or delays a third period of time at block 506, which can be a random number from 0 to 4 minutes dependent upon the specific configuration. Such a delay period is also referred to as a reactivation delay period. After the delay, at block 507, processing logic reactivates a secondary data stream that has been previously deactivated. The process then loops back to block 501 to monitor the throughput for a period of time, such as, in this situation, N=1 for 1 minute, and the operations above are iteratively performed.

According to some embodiments, data streams are (re)activated provided global parallelism configuration rules allow, such as no more than 16 activated streams on the given client at any one time. APC's 1-minute window trial sampling for every 10 minutes limits exposure in case a newly (re)activated stream degrades performance and has to be immediately deactivated once again. This is APC's overhead trade-off for its benefit over the non-APC approach. It can be mitigated by reducing the 1-minute trial sampling duration or increasing the 10-minute cycle duration. For example, according to another embodiment, instead of 10-minute windows, use 15-minute ones to reduce APC's trade-off overhead. Note that multi-streaming data transfer and APC target sufficiently long data transfer durations. The random reactivation delay provides a statistically crude yet effective way to minimize an APC save point from repeatedly getting into the same reactivate-deactivate cycle with another save point competing for the same stressed resource(s).

The APC approach for data transfer (e.g., backup, replication, migration) has significant advantage over the non-APC approach. The APC approach has automatic optimal throughput tuning with nominal runtime overhead. Unpredictable client workload mixtures are handled by automatic data streaming adjustments. The full resource chain from source client disks to target storage devices is indirectly considered, including CPU and memory, which might be used heavily in certain pre-data transfer and post-data transfer processing such as encryption, compression, data deduplication, and so forth. Where feasible for less volatile data transfers, APC performance logs can be used to determine the smallest number of data streams to allocate for those data sets. For instance, if most of the time only two out of four allocated data streams ever remain activated, then that data set can be configured to allocate only two data streams at start up, both of which will be expected to remain activated at all times. The APC approach provides a significantly better throughput than the non-APC approach by considering real-time feedback and taking immediate readjustment action by throttling active streaming. APC continuously adapts to the least number of activated data streams that achieves the maximum throughput at any point in time.

Figure 6:
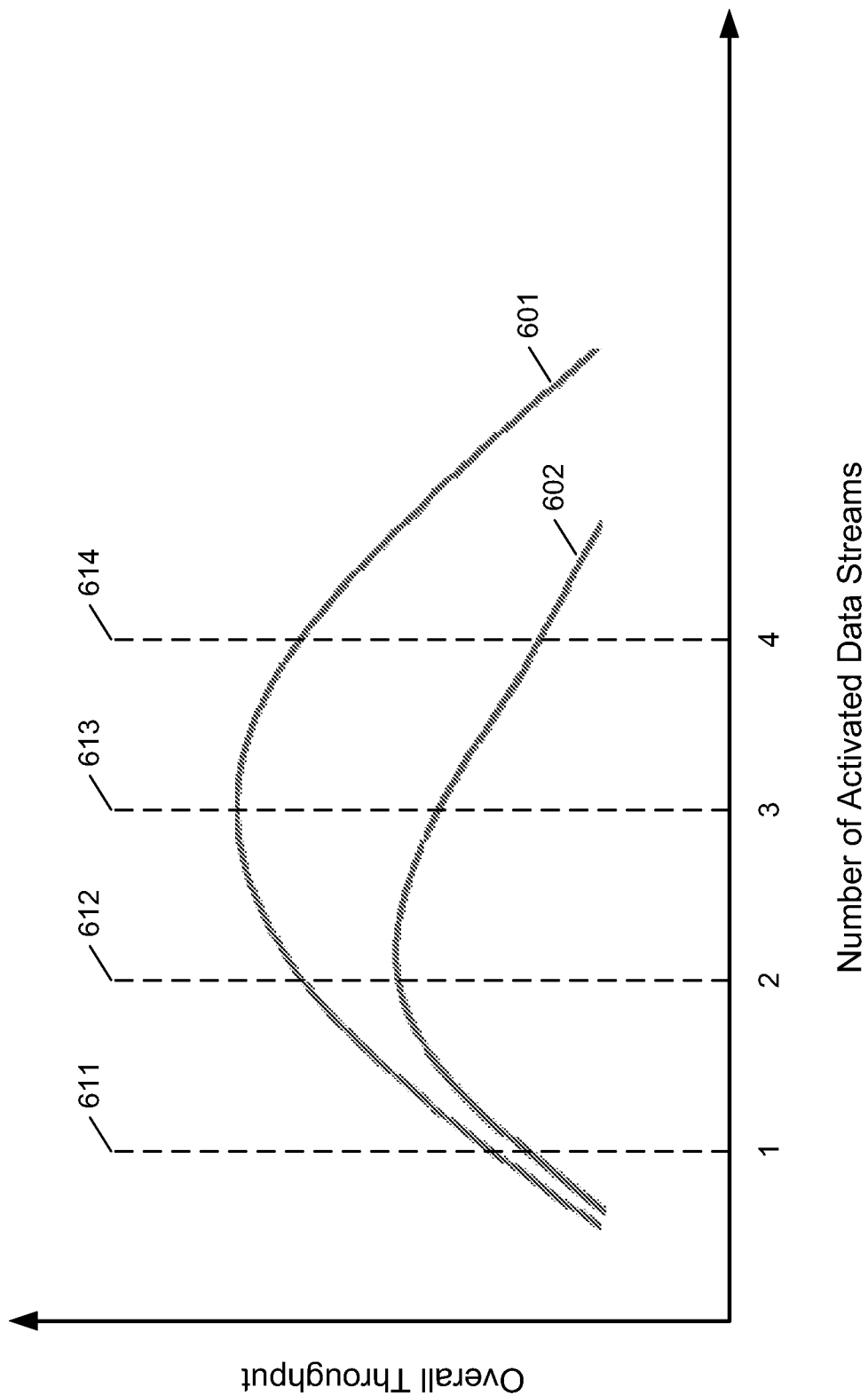
FIG. 6 is a diagram illustrating how a data transfer throughput is affected based on a number of activated data streams according to one embodiment of the invention.

FIG. 6 is a diagram illustrating how a data transfer throughput is affected based on a number of activated data streams according to one embodiment of the invention. Referring to FIG. 6, curve 601 represents initial performance of a data transfer session of a data set in view of the number of activated data streams utilized. For the purpose of illustration, it is assumed that four data streams have been allocated for transferring the data set from a source system to a target system. As shown in FIG. 6, the performance reaches its peak when 3 activated data streams are utilized as indicated by APC's vertical line 613. APC would only use 3 activated data streams. In a non-APC approach, all four allocated data streams are activated on startup and remain activated throughput, as shown by vertical line 614. Line 614 intersects each performance curve 601 and curve 602 at lower throughput heights than APC's line 613 on curve 601 and line 612 on curve 602 respectively.

All four allocated data streams may be activated as indicated by vertical line 614 and subsequently the performance may drop as indicated by performance curve 602, which occurs at a later time. The performance may drop due to a variety of reasons, including those that are not related to the source system (e.g., network bandwidth, target system). In the non-APC approach, the number of the activated data streams will remain the same equal to the number of allocated data streams (earlier assumed to be four) because the number of activated data streams is not adjustable. As a result, some processing resources may become bottlenecked, i.e. over-utilized, as shown by line 614 (or wasted, i.e. under-utilized, as shown by line 611 assuming only one data stream were to be allocated).

The APC's goal is to (re)adjust its vertical peak slider-line to close to the start of the peak of the performance curve that characterizes the data transfer session at any given point in time. In the example of curve 601, the APC system is to monitor the overall throughput of the activated data streams and dynamically adjust the number of activated data streams to close to vertical line 613. Subsequently, a different shaped curve, in this example, curve 602, might evolve during the same data transfer session or across different data transfer sessions, i.e. different days. The new curve's peak will expectedly move to the lower left or upper right. Either of the two curves shown here with their APC peak vertical lines could be the newer curve, although curve 602 is assumed to be such in this and the preceding paragraphs.

The new curve arises from changes in workloads placed on resources shared with other concurrent data transfer or non-data transfer processes, changes in the data fragmentation, replacement changes in resources themselves, and so forth. A new curve could be considered the equivalent to that under a slower or faster bottleneck resource for the same data set being transferred alone. Note that for significantly different curves to manifest on faster resources, i.e. for APC readjustment to kick-in following significant persistent performance drop-off, the number of allocated data streams per data set might need to be more than four.

For the purpose of illustration, it is assumed that initially, during an APC approach and a non-APC approach, all four data streams are allocated and activated as indicated by vertical line 614 and the performance of the data transfer is represented by curve 601. The performance represented by curve 601 initially starts to increase from vertical lines 611-612, reach its peak at vertical line 613, and drops around vertical line 614. For the non-APC approach, the number of activated data streams will remain four as indicated by vertical line 614. However, the APC approach will dynamically adjusts the number of activated data streams based on the performance at the point in time to be around its performance peak as indicated by vertical line 613 (e.g., three activated data streams).

Subsequently, due to a variety of reasons, the characteristics of the performance curve change, for example, from curve 601 to curve 602. For example, there may be another data transfer session or another process starts competing the processing resource. Alternatively, there may be network congestion or target system is busy that causes the performance to drop. In the non-APC approach, the number of activated data streams will remain the same as four data streams. However, in the APC approach, the number of activated streams will be adjusted to maintain the performance close to the peak of curve 602 as indicated by vertical line 612 (e.g., two activated data streams). As a result, the performance and the required processing resources are optimized and balanced by the APC system as described above.

Consider a backup client with save points SP1 & SP2 with maximal throughput at eight concurrent data streams when they run together by themselves, e.g. SP1×4 streams+SP2×4 streams, or SP1×8 streams+SP2×0 streams. Similarly, consider additional save points SP3 & SP4 with maximal throughput at four concurrent data streams together by themselves, e.g. SP3×2 streams+SP4×2 streams, or SP3×4 stream+SP4×0 streams. However, assume independent pairs SP1 & SP3 have maximal throughput at twelve concurrent data streams when they run together, i.e. SP1×8 streams+ SP3×4 streams, and similarly for other independent pairings. All streams discussed here are activated. Eight data streams are allocated for each of SP1 and SP2, and 4 data streams are allocated for each of SP3 and SP4.

A non-APC administrator has to be aware of the foregoing intricacies. Moreover, the administrator is limited to configuring the client parallelism (CP) setting to 4, 8 or 12 overall number of parallel streams. However, each of these settings would generally lead to a non-optimal throughput. For example, CP=8 would be suitable for SP1 & SP2 running together but would degrade performance if SP3 & SP4 run together. Likewise, CP=4 would be suitable for SP3 & SP4 running together but would under-utilize resources with subpar throughput when SP1 & SP2 run together. Manual backup configuration for optimal throughput would be infeasible.

However, an APC administrator would simply set CP=12 and allow the APC system to maximize throughput by automatically varying the number of activated parallel streams up and down. There will also be no need to worry about juggling the order of save point backups. The APC system would concurrently start with and activate, say, SP1 at 7 streams+SP2 at 1 stream+SP3 at 4 streams. Non-APC, however, would concurrently start with SP1 at 8 streams+ SP2 at 4 streams for overall significantly worse performance than the APC approach.

For certain environments, the APC system can be configured to limit the frequency of changing the number of activated parallel streams per save point. A new parameter can control this aspect of APC. For administrators requiring VM-unaware backup, APC backup addresses concerns where different VM guest clients indirectly share their physical host's resources. Non-APC backup, however, would encounter similar problems described above. The APC techniques can also be applied to any application requiring transfer of bulk data that can be broken up into multiple parallel streams. The APC system also handles the full range of software and hardware resources, including CPU, memory, network from a source to a target.

Note that some or all of the components as shown and described above (e.g., storage software 152, APC system 150, storage service logic 106, and/or deduplication logic 107 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
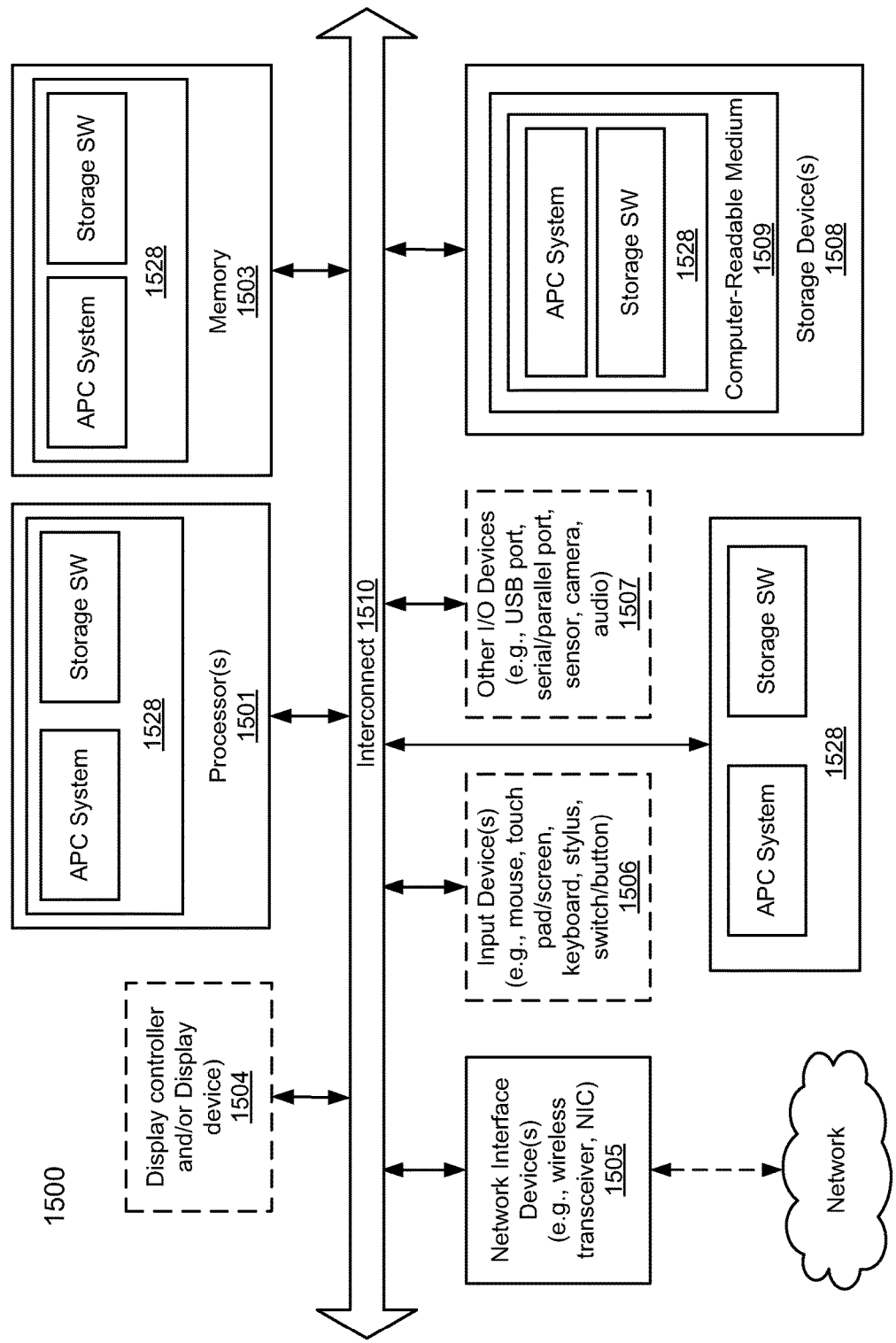
FIG. 7 is a block diagram illustrating a data processing system according to one embodiment.

FIG. 7 is a block diagram illustrating an example of a data processing system which may be used with one embodiment of the invention. For example, system 1500 may represent any of data processing systems described above performing any of the processes or methods described above, such as, for example, source system 102, target system 104, or management system 160 of FIG. 1.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for managing data streams for data transfer operations, the method comprising:
in response to a request to transfer a data set from a source system to a target system over a network, activating, by an adaptive performance control (APC) controller, a primary data stream and a first secondary data stream from a set of allocated data streams to transfer the data set from the source system to the target system;
monitoring an overall throughput of the activated data streams for a first predetermined period of time;
deactivating the first secondary data stream from the activated data streams if the overall throughput drops below a first predetermined threshold over the first predetermined period of time;
suspending an operation of the APC controller for a second predetermined period of time in response to determining that the overall throughput drop is not greater than the first predetermined threshold and there is at least one allocated data stream that has been previously deactivated; and
reactivating the first secondary data stream that has been previously deactivated, after the second predetermined period of time.

2. The method of claim 1, wherein the primary data stream remains activated during the transfer of the data set, and a secondary data stream can be activated, deactivated, or reactivated during the transfer of the data set.

3. The method of claim 1, wherein a number of the activated data streams is adjusted based on the monitored overall throughput of the activated data streams, such that a maximum overall throughput of the activated data streams is reached while maintaining a minimum number of the activated data streams.

4. The method of claim 1, further comprising:
determining whether all allocated data streams have been activated if the overall throughput does not drop below the first predetermined threshold;
iteratively performing monitoring the overall throughput for the first predetermined period of time and deactivating a secondary data stream, in response to determining that all allocated data streams have been activated.

5. The method of claim 1, further comprising deactivating a third secondary data stream from the activated data streams, in response to determining that the overall throughput has gained less than a second predetermined threshold after activating of the first secondary data stream.

6. The method of claim 1, further comprising iteratively performing activating the first secondary data stream and monitoring the overall throughput for the first predetermined period of time, if the overall throughput has gained more than or equal to the second predetermined threshold.

7. The method of claim 5, further comprising determining whether all allocated data streams have been activated, wherein iteratively performing activating the first secondary data stream and monitoring the overall throughput for the first predetermined period of time is performed only if there is at least one allocated data stream that has not been activated.

8. A non-transitory machine-readable medium having instructions stored therein, which when executed by a processor, cause the processor to perform operations of managing data streams for data transfer operations, the operations comprising:
in response to a request to transfer a data set from a source system to a target system over a network, activating, by an adaptive performance control (APC) controller, a primary data stream and a first secondary data stream from a set of allocated data streams to transfer the data set from the source system to the target system;
monitoring an overall throughput of the activated data streams for a first predetermined period of time;
deactivating the first secondary data stream from the activated data streams if the overall throughput drops below a first predetermined threshold over the first predetermined period of time;
suspending an operation of the APC controller for a second predetermined period of time in response to determining that the overall throughput drop is not greater than the first predetermined threshold and there is at least one allocated data stream that has been previously deactivated; and
reactivating the first secondary data stream that has been previously deactivated, after the second predetermined period of time.

9. The machine-readable medium of claim 8, wherein the primary data stream remains activated during the transfer of the data set, and a secondary data stream can be activated, deactivated, or reactivated during the transfer of the data set.

10. The machine-readable medium of claim 8, wherein a number of the activated data streams is adjusted based on the monitored overall throughput of the activated data streams, such that a maximum overall throughput of the activated data streams is reached while maintaining a minimum number of the activated data streams.

11. The machine-readable medium of claim 8, wherein the operations further comprise:
determining whether all allocated data streams have been activated if the overall throughput does not drop below the first predetermined threshold;
iteratively performing monitoring the overall throughput for the first predetermined period of time and deactivating a secondary data stream, in response to determining that all allocated data streams have been activated.

12. The machine-readable medium of claim 8, wherein the operations further comprise deactivating a third secondary data stream from the activated data streams, in response to determining that the overall throughput has gained less than a second predetermined threshold after activating of the first secondary data stream.

13. The machine-readable medium of claim 8, wherein the operations further comprise iteratively performing activating the first secondary data stream and monitoring the overall throughput for the first predetermined period of time, if the overall throughput has gained more than or equal to the second predetermined threshold.

14. The machine-readable medium of claim 12, wherein the operations further comprise determining whether all allocated data streams have been activated, wherein iteratively performing activating the first secondary data stream and monitoring the overall throughput for the first predetermined period of time is performed only if there is at least one allocated data stream that has not been activated.

15. A data processing system operating as a source system, comprising:

a processor; and a memory storing instructions, which when executed by the processor, cause the processor to perform operations, the operations including in response to a request to transfer a data set from a source system to a target system over a network, activating, by an adaptive performance control (APC) controller, a primary data stream and a first secondary data stream from a set of allocated data streams to transfer the data set from the source system to the target system, monitoring an overall throughput of the activated data streams for a first predetermined period of time, deactivating the first secondary data stream from the activated data streams if the overall throughput drops below a first predetermined threshold over the first predetermined period of time, suspending an operation of the APC controller for a second predetermined period of time in response to determining that the overall throughput drop is not greater than the first predetermined threshold and there is at least one allocated data stream that has been previously deactivated, and reactivating the first secondary data stream that has been previously deactivated, after the second predetermined period of time.

16. The system of claim 15, wherein the primary data stream remains activated during the transfer of the data set, and a secondary data stream can be activated, deactivated, or reactivated during the transfer of the data set.

17. The system of claim 15, wherein a number of the activated data streams is adjusted based on the monitored overall throughput of the activated data streams, such that a maximum overall throughput of the activated data streams is reached while maintaining a minimum number of the activated data streams.

18. The system of claim 15, wherein the operations further comprise:

determining whether all allocated data streams have been activated if the overall throughput does not drop below the first predetermined threshold;

iteratively performing monitoring the overall throughput for the first predetermined period of time and deactivating a secondary data stream, in response to determining that all allocated data streams have been activated.

19. The system of claim 15, wherein the operations further comprise deactivating a third secondary data stream from the activated data streams, in response to determining that the overall throughput has gained less than a second predetermined threshold after activating of the first secondary data stream.

20. The system of claim 15, wherein the operations further comprise iteratively performing activating the first secondary data stream and monitoring the overall throughput for the first predetermined period of time, if the overall throughput has gained more than or equal to the second predetermined threshold.

21. The system of claim 19, wherein the operations further comprise determining whether all allocated data streams have been activated, wherein iteratively performing activating the first secondary data stream and monitoring the overall throughput for the first predetermined period of time is performed only if there is at least one allocated data stream that has not been activated.

* * * * *